US006386850B1

United States Patent
Salerno et al.

(10) Patent No.: US 6,386,850 B1
(45) Date of Patent: May 14, 2002

(54) MACHINE FOR FORMING MOLDED FOAM CUSHIONS

(75) Inventors: Mark H. Salerno, Stratford, CT (US); Michael J. Seckler, Wappinger Falls, NY (US)

(73) Assignee: Sealed Air Corporation (US), Saddlebrook, NJ (US)

( * ) Notice: Subject to any disclaimer, the term of this patent is extended or adjusted under 35 U.S.C. 154(b) by 0 days.

(21) Appl. No.: 09/532,676

(22) Filed: Mar. 21, 2000

(51) Int. Cl.[7] .............................. B29C 44/36; B65B 9/02
(52) U.S. Cl. ..................... 425/112; 53/553; 425/143; 425/436 R; 425/437
(58) Field of Search .................................. 425/112, 143, 425/436 R, 437; 264/335; 53/553

(56) References Cited

U.S. PATENT DOCUMENTS

| 3,548,451 A | * | 12/1970 | Carmi et al. ............... 425/437 |
| 4,045,153 A | * | 8/1977 | Maurino et al. ............. 264/335 |
| 4,571,320 A | * | 2/1986 | Walker ..................... 264/335 |
| 4,783,292 A | * | 11/1988 | Rogers ..................... 264/50 |
| 5,027,583 A | | 7/1991 | Chelak ..................... 53/451 |
| 5,252,617 A | * | 10/1993 | Werner et al. ............... 521/56 |
| 5,376,219 A | | 12/1994 | Sperry et al. ............... 156/515 |
| 5,776,510 A | | 7/1998 | Reichental et al. ........... 425/112 |
| 5,935,511 A | * | 8/1999 | Brown ..................... 425/437 |
| 5,948,341 A | * | 9/1999 | Diamond et al. ............. 425/437 |
| 6,003,288 A | | 12/1999 | Sperry et al. ............... 53/552 |

FOREIGN PATENT DOCUMENTS

| DE | 1 604 468 | | 10/1970 | |
| DE | 27 49 549 | * | 5/1979 | ............ 425/437 |
| DE | 32 34 284 | * | 5/1984 | ............ 425/437 |
| JP | 6-99438 | * | 4/1994 | ............ 425/437 |

* cited by examiner

*Primary Examiner*—Allan R. Kuhns
(74) *Attorney, Agent, or Firm*—Thomas C. Lagaly

(57) ABSTRACT

A machine for forming molded foam cushions, including an apparatus for enclosing a foamable composition in a flexible bag; a mold having a cavity and a closure mechanism and being movable between an open position and a closed position such that, when in the closed position, the closure mechanism and the cavity define an enclosed three-dimensional shape, the mold comprising a material capable of transferring sufficient heat to or from the cavity to maintain the cavity at a desired temperature; a device for controlling the temperature of the mold cavity; means for placing the bag in the mold cavity while the mold is in the open position, whereby, when the mold assumes the closed position, the foamable composition expands within the cavity to form a foam cushion that substantially conforms to the three-dimensional shape; and means for pulling the foam cushion from the mold cavity.

14 Claims, 8 Drawing Sheets

MACHINE FOR FORMING MOLDED FOAM CUSHIONS

BACKGROUND OF THE INVENTION

The present invention relates to protective packaging cushions that comprise molded foam contained within a bag. More specifically, the invention relates to a machine and method to allow the end-use packager to automatically make such cushions as needed.

The present invention is related to foam-in-place packaging, and offers an alternative to high inventory packaging materials such as corrugated board forms (e.g., cardboard) and premolded polymer (e.g., polystyrene foam) forms.

Foam-in-place packaging is a highly useful technique for on-demand protection of packaged objects. In its most basic form, foam-in-place packaging comprises injecting foamable compositions from a dispenser into a container that holds an object to be cushioned. Typically, the object is wrapped in plastic to keep it from direct contact with the rising (expanding) foam. As the foam rises, it expands into the remaining space between the object and its container (e.g. a corrugated board box) thus forming a custom cushion for the object.

A common foaming composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, the foam precursors are injected into a plastic bag which is then dropped into a container holding the object to be cushioned. The rising foam again tends to expand into the available space, but does so inside the bag. Because the bags are formed of flexible plastic, they form individual custom foam cushions for the packaged objects. In several techniques, a specific apparatus is used to make the bag from plastic film while concurrently injecting it with foam. Exemplary devices are assigned to the assignee of the present invention, and are illustrated, for example, in U.S. Pat. Nos. 5,027,583, 5,376,219, and 6,003,288, the contents of each of which are incorporated entirely herein by reference.

Such foam-in-place packaging has gained wide acceptance in many industries. The nature of the technique and the cushions, however, are such that each individual cushion forms a shape that is dictated by a number of variables including the size and shape of the object being packaged, the size and shape of the container, the position of the object in the container, and the placement of the bag in the container before the foam finishes rising. As a result—and indeed as an advantage in many circumstances—each foam cushion tends to be a unique customized shape different from almost all other similar cushions. Any cushions that turn out similar or identical do so only by random chance. Accordingly, such random foam-in-place packaging cushions are highly sought after in packaging situations where different objects of different sizes and different shapes must be placed in different boxes on a regular basis. In such circumstances, cushions limited to specific shapes and sizes would represent a disadvantage rather than an advantage.

There are, however, other packaging applications in which similar or identical objects are repeatedly placed in similar or identical orientations in similar or identically sized containers. Such circumstances greatly decrease the need for continuously varying custom cushion sizes, and instead increase the need for more standard packaging elements that have a consistent size and shape.

To date, such standard packaging has been provided by several types of materials. Premolded polystyrene foam is one such common example, as are precut corrugated board (sometimes referred to colloquially as "cardboard"), pressed paper, and other similar materials.

Although such materials are quite useful, their precut (e.g. corrugated board) or premolded (e.g. polystyrene foam) nature requires maintaining an inventory of such materials that corresponds to the inventory of items to be packaged. Accordingly, in situations where a large number of objects must be packaged and shipped, a correspondingly large inventory of the packaging cushion materials must be kept in the immediate vicinity. Because the nature of most cushioning materials is such that they have a high ratio of volume to weight, they tend to take up a relatively large amount of space. Thus, such space must be provided and maintained in the immediate vicinity of the objects to be packaged. In a business environment, such inventory space represents a cost. Accordingly, a significant space savings represents a significant cost savings.

U.S. Pat. No. 5,776,510 discloses an apparatus and method for automatically molding defined three-dimensional polyurethane foam cushions utilizing the foam-in-place techniques discussed above, but with added feature of placing a bag containing a foamable composition in a mold as the composition begins to form foam, and maintaining the bag in the mold until the composition has finished forming a foam cushion in a shape conforming to the shape of the mold. This invention has beneficially combined the advantages of on-demand, foam-in-place packaging with the ability to produce standard packaging cushions having a consistent size and shape. However, the inventors hereof have identified several areas where improvement is desired with respect to the apparatus and method disclosed in the '510 patent.

First, the '510 patent specifies that the mold is formed of wood. While wood is advantageous in that it is inexpensive and light weight, it is an insulating (as opposed to conductive) material and therefore does not permit the temperature of the mold to be controlled, i.e., by either adding heat to or removing heat from the mold as necessary to maintain the mold at a desired temperature. Typically, the temperature of the mold tends to increase over time in response to consecutive cushionmaking cycles, since the process of making polyurethane foam is generally exothermic. The invention disclosed in the '510 patent attempts to overcome the inability to control the mold temperature by adjusting the amount of foamable composition dispensed into the bag in response to the changing temperature within the mold. However, varying the amount of foamable composition also varies the cure time for the foam, making it difficult for the operator to know when to remove the cushion from the mold. In addition, the density of the cushions also varies with varying amounts of foamable composition, leading to inconsistent weights and cushioning performance among cushions made in a given mold, which otherwise should be standardized for an intended packaging application.

Secondly, the apparatus disclosed in the '510 patent has no means for automatically removing the finished foam cushion from the mold. Instead, the cushion must be removed manually by an operator. While the '510 apparatus provides some assistance to the operator by blowing air into the mold to help release the cushion therefrom, this method has not proven to be sufficiently reliable and efficient for commercial production. Manual removal of the cushions has proven to be excessively slow, often providing a "bottle neck" to the production process. In addition, blowing air into the mold is frequently insufficient to release the cushions, causing interruptions in foam cushion production as the non-releasing (i.e., stuck) cushions must be forceably removed from the mold. Further, once the cushions have been removed from the mold, they must be manually moved away from the mold and placed in a designated location for later use, which can further slow the rate of production.

A third area in which improvement of the '510 apparatus would be desired pertains to the ability of the apparatus to accommodate mold shapes in which the majority of the foam is located on one side of the mold, as opposed to being more uniformly distributed relative to the vertical centerline of the mold. An example of such a mold is a "C" shaped mold, in which the hollow portions of the mold, in which the foam is intended to expand, reside primarily to the left of the vertical centerline, with most of the center and right-of-center portions being solid such that virtually no void space exists between the solid portions of the mold and the mold door when the door is closed. When foam is dispensed in the center of such a mold, as is the case with the apparatus shown in the '510 patent, some or most of the foam is often squeezed out of the sides of the mold when the mold door is closed, resulting in an improperly formed cushion and often a ruptured bag.

Accordingly, a need exists in the art for an improved foam-in-place packaging machine that produces standard packaging cushions having a consistent size and shape, and which overcomes the foregoing limitations of the current machine.

SUMMARY OF THE INVENTION

That need is met by the present invention, which provides a machine for forming molded foam cushions, comprising:

a. an apparatus for enclosing a foamable composition in a flexible bag;

b. a mold having a cavity and a closure mechanism and being movable between an open position and a closed position such that, when in the closed position, the closure mechanism and the cavity define an enclosed three-dimensional shape, the mold comprising a material capable of transferring sufficient heat to or from the cavity to maintain the cavity at a desired temperature;

c. a device for controlling the temperature of the mold cavity;

d. means for placing the bag in the mold cavity while the mold is in the open position, whereby, when the mold assumes the closed position, the foamable composition expands within the cavity to form a foam cushion that substantially conforms to the three-dimensional shape; and e. means for pulling the foam cushion from the mold cavity.

The invention also provides a method for forming molded foam cushions, comprising:

a. enclosing a foamable composition in a flexible bag;

b. placing the bag in a cavity of a mold, the mold comprising a material capable of transferring sufficient heat to or from the cavity to maintain the cavity at a desired temperature, the mold further including a closure mechanism, the mold being movable between an open position and a closed position such that, when in the closed position, the closure mechanism and the cavity define an enclosed three-dimensional shape;

c. closing the mold as the foamable composition begins to expand in the bag so that the composition forms a foam cushion that substantially conforms to the three-dimensional shape of the mold;

d. controlling the temperature of the mold cavity to provide a desired cavity temperature during the formation of the foam cushion; and e. opening the mold and pulling the foam cushion from the cavity.

DETAILED DESCRIPTION OF THE INVENTION

Figure 1:
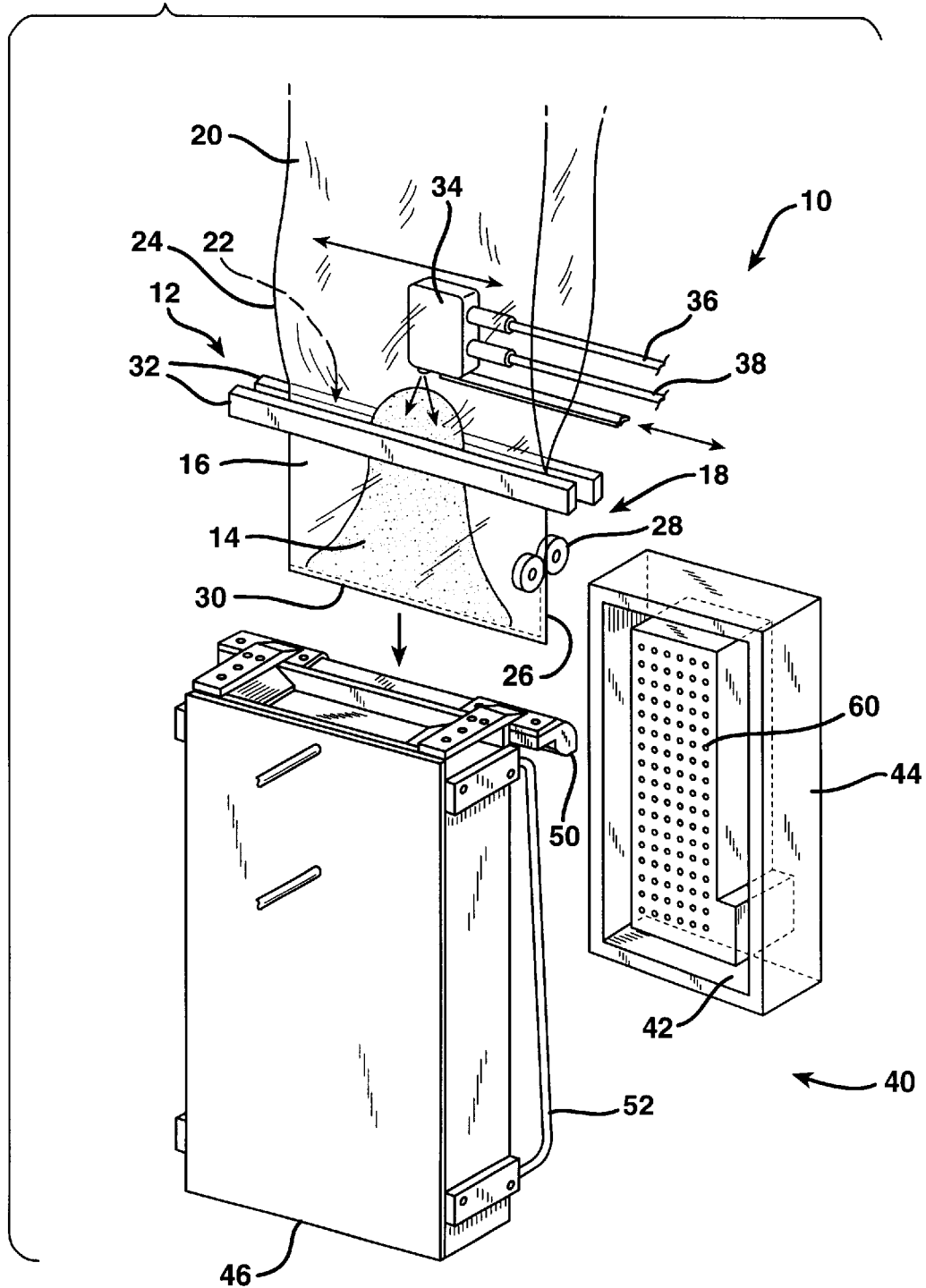
FIG. 1 is a perspective view of a machine for forming molded foam cushions in accordance with the present invention.

The present invention is a machine and method for automatically molding foam cushions with defined three-dimensional geometry. FIG. 1 is a perspective view of the machine broadly designated at 10. The machine 10 includes an apparatus 12 for enclosing a foamable composition 14 in a flexible bag 16. It will be understood that as used herein, the term "bag" is used in a broad sense, to designate a sealed container made from flexible sheet material, and could include structures that are also referred to as "envelopes", "pouches", or other related terms, without departing from the scope of the claims. The term "bag" is nevertheless accurate and convenient and will be used throughout this specification.

Apparatus 12 can comprise any of several devices that form bags while concurrently filling them with a foamable composition. Several such devices have been set forth in the background portion of the specification and their representative patents incorporated herein. Exemplary devices are also available from the assignee of this invention, Sealed Air Corporation of Saddle Brook, N.J., under the trademarks INSTAPACKER™, VERSAPACKER™, and SPEEDYPACKER™, among others. The operation and structure of these devices has been well described in the aforementioned incorporated patents and will not be repeated herein except where otherwise necessary to illustrate particular aspects of the present invention.

Briefly, apparatus 12 preferably includes a mechanism 18 for converting a predetermined amount of flexible film 20 into a bag 16 having an opening 22 therein. The flexible film 20 is preferably withdrawn from a supply of such film (not shown), such as from a storage roll which can be unwound to supply the film as needed. In the embodiment illustrated, the bag 16 is prepared from a sheet of flexible, thermoplastic film 20 having a center fold 24 on one longitudinal edge thereof. The bag 16 is formed by sealing closed the opposite longitudinal edge 26, which is open prior to being sealed closed by heated rollers 28, and also sealing the bottom transverse edge 30. The sealed bottom edge 30 is formed by severing and sealing mechanism 32, which simultaneously seals the bottom edge 30, severs the preceding bag (not shown) when sufficiently filled with foamable composition 14, and also seals closed the opening 22 of the preceding bag. The center fold 24 forms the third closed edge of the bag. The foregoing bag-making techniques are described in more detail in U.S. Pat. No. 6,003,288.

Apparatus 12 further includes a device 34 for dispensing a predetermined amount of the foamable composition 14 through opening 22 and into the bag 16. In a preferred embodiment, the foamable composition 14 is a mixture of at least one polyol, as supplied to the dispensing device 34 via supply line 36, and at least one isocyanate as supplied through supply line 38. As explained in the background section hereinabove, the polyol and isocyanate react to form a polyurethane foam in bag 16. As shown, the dispensing device 34, in which the polyol and isocyanate are mixed and then dispensed into the bag, is positioned within the center-folded film 20 via the open longitudinal edge 26. As the film, which moves in a downward direction as indicated by the arrow, passes the dispensing device, the open edge 26 is sealed by heated rollers 28.

As briefly noted above, the apparatus 12 also includes a device for closing the remaining opening 22 in the bag 16. Conveniently, this is provided by the severing and sealing mechanism 32, which seals closed the bag when a sufficient, predetermined amount of film and foamable composition have been dispensed. The resultant bag size and amount of foamable composition contained therein will vary, depending upon the particular packaging application for which the final foam cushion is intended. Additional details concerning these latter aspects of the bagmaking and filling process, and machinery therefor, are disclosed in U.S. Pat. No. 6,003,288.

As an alternative to using a center-folded film as described above, the flexible bag can be prepared from two separate sheets of plastic film that are sealed along two longitudinal edges and two transverse edges to form the bag, such as is described in the above-incorporated U.S. Pat. No. 5,376,219, or by preparing the bag from a tube of plastic film material and thereafter sealing two transverse edges to form the bag.

Figure 2:
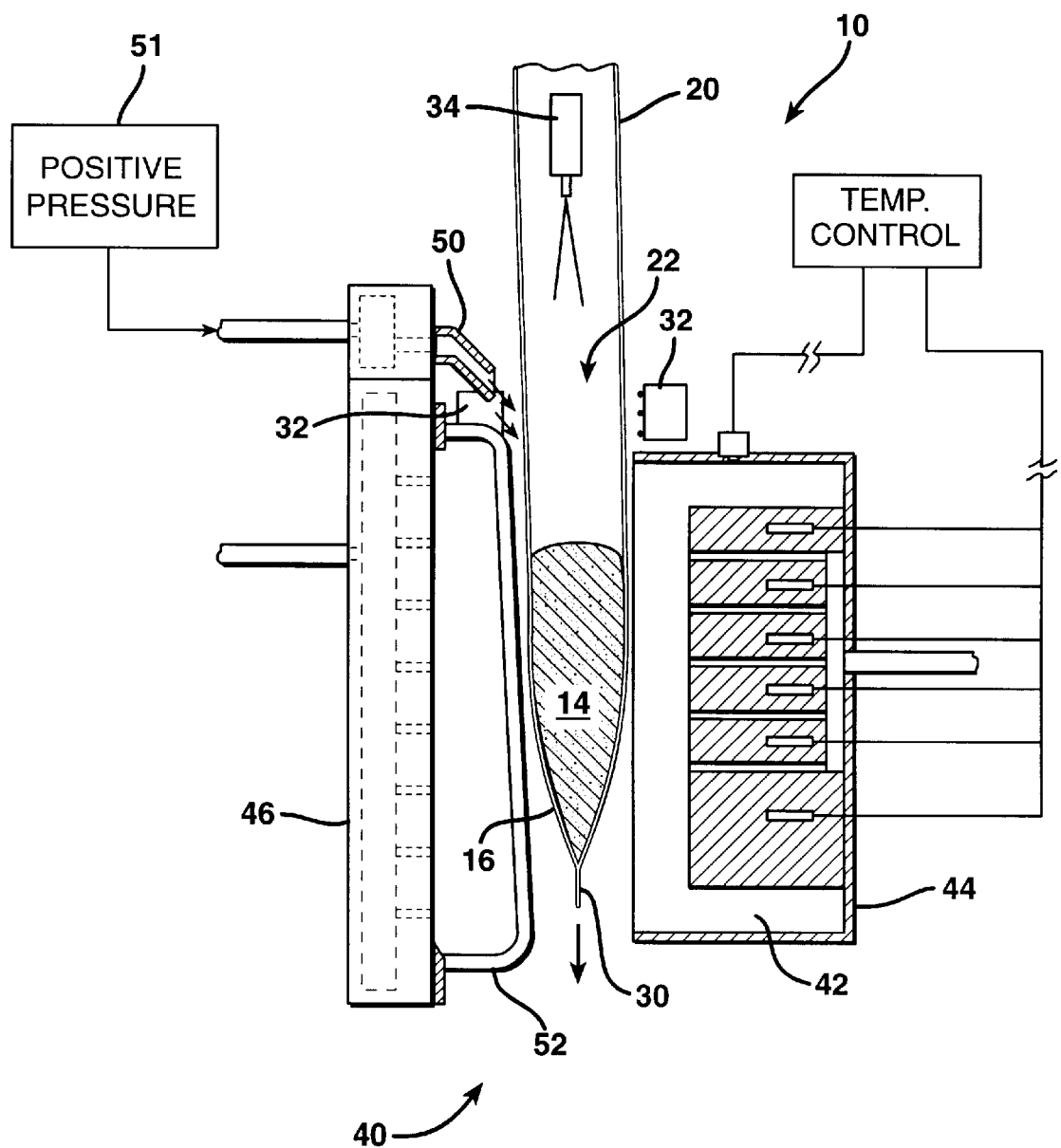
FIG. 2 is a cross-sectional, elevational view of the machine shown in FIG. 1.
Figure 3:
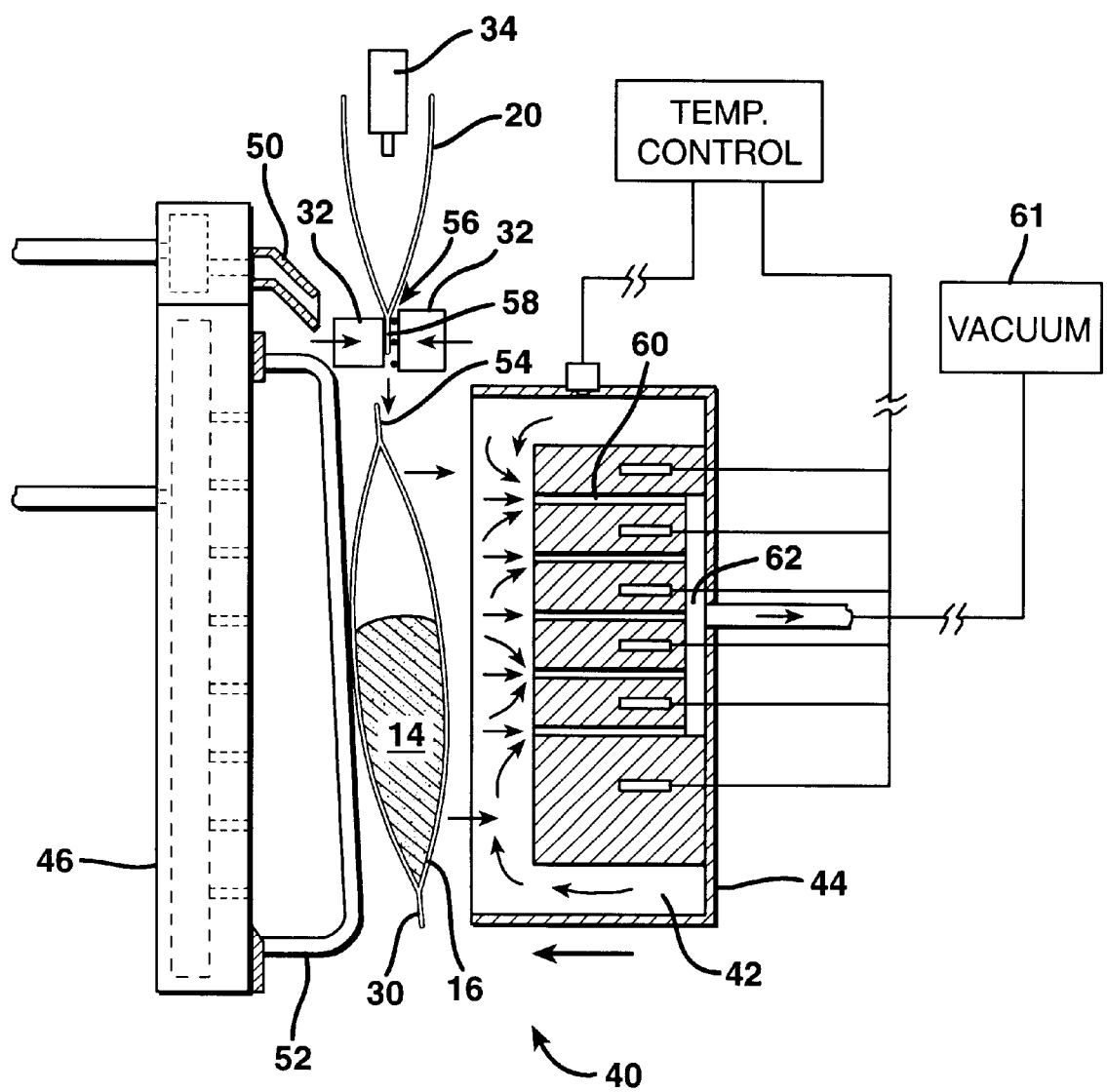
FIG. 3 is similar to FIG. 2, except that a filled bag has been sealed and severed from the film web and is being pulled into the mold.
Figure 4:
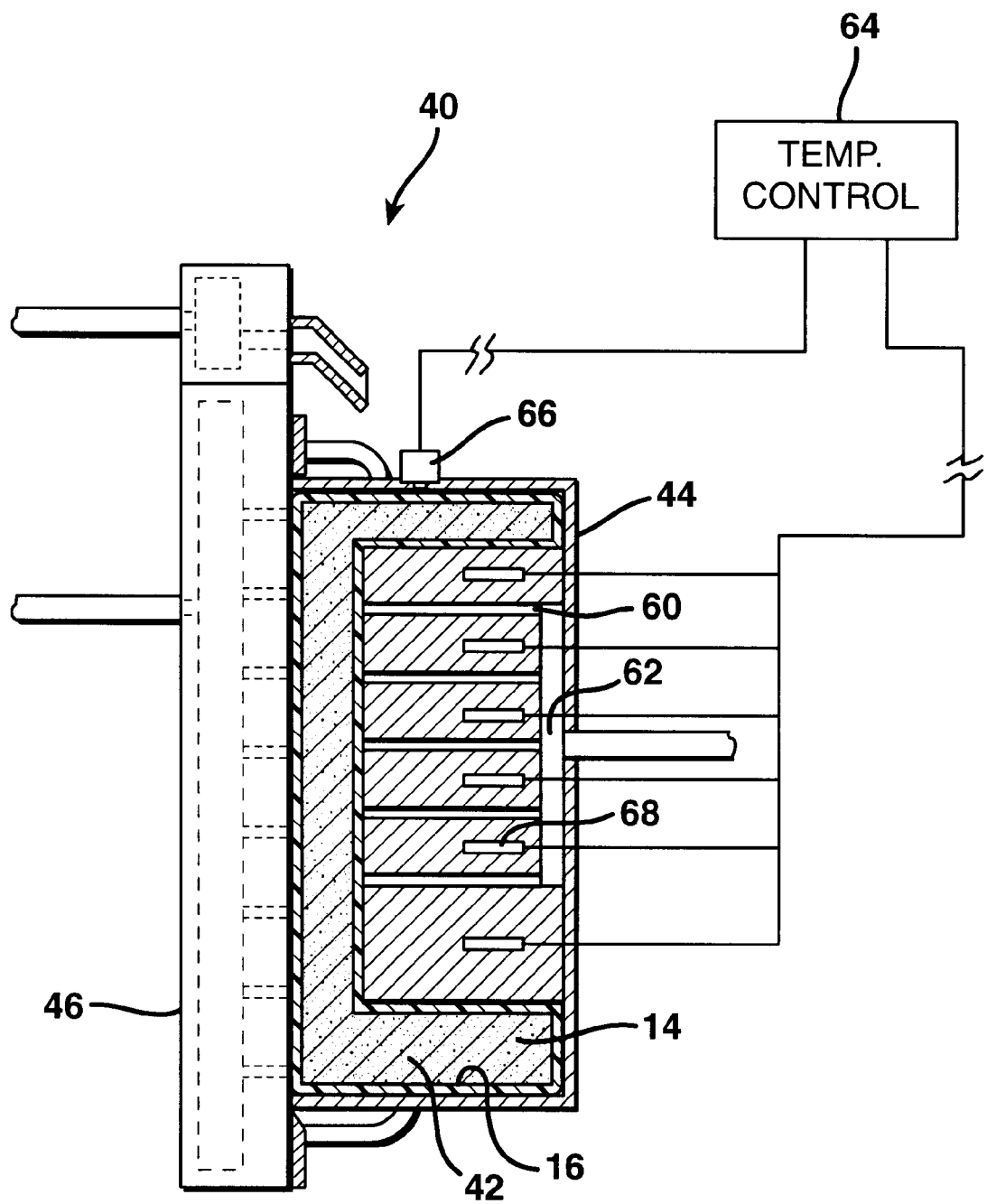
FIG. 4 is similar to FIG. 3, except that the mold has closed and the foam is expanding within the mold.

As illustrated in FIG. 1, the machine 10 in accordance with the invention also includes a mold, generally designated as 40, having a cavity 42 in housing 44, as well as a closure mechanism 46 that is engageable with the cavity housing 44. Briefly, the mold 40 is movable between an open position as shown in FIGS. 1–3 and a closed position as shown in FIG. 4. When in the closed position, closure mechanism 46 and cavity 42 together define an enclosed three-dimensional shape. Machine 10 further includes means (described below) for placing bag 16 in mold cavity 42 while mold 40 is in the open position (shown in FIGS. 1–3). In this manner, when the mold assumes the closed position (FIG. 4), the foamable composition 14 contained in bag 16 expands within mold cavity 42 to form a foam cushion 48 (FIGS. 5–7) that substantially conforms to the three-dimensional shape defined by the closure mechanism 46 and cavity 42.

As bag 16 descends from bag-making/foam dispensing apparatus 12, it moves into a position that is between the two halves of the mold 40, i.e., between closure mechanism 46 and cavity housing 44. During this process, it is important that the bag moves into alignment with mold cavity 42 in order for the bag to be properly contained within the cavity when the mold is closed. Misalignment causes a portion of the bag to be outside of the mold cavity when the mold closes, often resulting in insufficient interior bag volume being available to accommodate the expansion of the foamable composition inside of the mold. When this occurs, the bag often bursts inside of the mold and releases the foamable composition into the mold cavity, requiring a shut-down of the mold while the foamable composition/foam is cleaned out of the mold cavity. With previous foam-in-bag molding machines, bag misalignment was a frequent problem.

In an effort to reduce bag misalignment and thereby improve reliability, cushion-forming machine 10 in accordance with the present invention includes bag placement means for aligning and placing the bag in the mold cavity. Such bag placement means in accordance with the invention may include means located on closure mechanism 46 for pushing bag 16 towards the mold cavity 42. As illustrated in FIGS. 1–3 and 6, such pushing means may include air knives 50 and guide rods 52. Air knives 50 direct a current of air, as indicated by the arrows in FIG. 2, from a positive pressure source 51 toward the bag 16 as it descends between the two halves of mold 40. The current of air from the air knives prevents the bag from getting caught or "hung-up" on closure mechanism 46 during its descent from bag-making/foam dispensing apparatus 12. The air knives are simply nozzles having one or more slits for controlling the direction and velocity of air supplied from a positive pressure source (e.g., a pump, fan, or turbine). The air knives 50 also have the effect of pushing the descending bag towards the mold cavity 42. The guide rods 52 perform a similar function by physically directing the descending bag in the intended direction, i.e., toward the mold cavity, as well as impeding lateral movement by the bag. Additional pneumatic, mechanical, and/or electromechanical devices may be employed as desired. For example, additional air knives or air jets may be included on closure mechanism 46.

FIG. 3 shows the severing and sealing mechanism 32 separating plastic bag 16 from the flexible film web 20 after a sufficient, predetermined amount of the foamable composition 14 has been placed in the bag. Mechanism 32 both heat seals the trailing or top transverse edge 54 of the bag 16, thereby sealing closed the opening 22 of the bag and, at the same time, severs the bag 16 from the remaining plastic film web 20 in a manner described in U.S. Pat. No. 6,003,288, which also describes how the longitudinal side seal 26 is formed. Essentially, both portions of mechanism 32 converge on the top transverse edge 52 as shown to seal and sever the bag from the film web 20. This may be done mechanically and/or electrically. A preferred means for sealing is by applying sufficient heat to the film to cause it to weld together. Similarly, severing is preferably carried out by the simultaneous application of sufficient heat to melt through both plys of film. This may be accomplished by employing three heated wires 56 as shown, with the middle wire being heated sufficiently to melt through and sever the bag 16 from the film web 20, and the upper and lower wires being heated to a somewhat lesser degree (or heated for a lesser amount of time while in contact with the film) to cause both the leading or bottom transverse edge 58 of the film 20 and the top transverse edge 54 of the bag 16 to seal closed. The sealed bottom edge 58 of the film 20 will become the bottom transverse edge 30 of the next bag to be made and filled with foamable composition 14 in the next cycle in which a filled bag/foam cushion is produced.

Another aspect of the bag placement means is also illustrated in FIG. 3, namely, in addition or as an alternative to the pushing means located on closure mechanism 46 as discussed above, means may be located in mold cavity 42 for pulling bag 16 into the cavity. Such pulling means may include an array of orifices 60 that are connected to a vacuum source 61 as shown, e.g., via internal manifold 62 in cavity housing 44. When vacuum is applied to the orifices 60 as shown, the bag 16 is pulled into the cavity 42.

In a preferred mode of operation, as best illustrated in FIG. 3, bag 16 is placed in cavity 42 as follows. When the bag has been filled with foamable composition 14 to a predetermined extent, severing and sealing mechanism 32 converge on the top transverse edge 54 to both seal the edge 54 closed and sever the bag from the film web 20. Simultaneously, vacuum source 61 is activated to pull the now-severed bag 16 into mold cavity 42 via orifices 60. Also simultaneously, or very soon thereafter, mold 40 begins to move to the closed position as the foamable composition 14 begins to expand in bag 16. As shown in FIG. 3, this is accomplished by moving housing 44 toward closure mechanism 46 as indicated by the arrow. Alternatively, housing 44 may remain stationary and closure mechanism 46 may be moved toward the housing or both halves of mold 40 may be moved towards each other.

FIG. 4 shows mold 40 in the fully closed position, i.e., closure mechanism 46 has fully engaged with housing 44, with bag 16 and the foamable composition 14 enclosed therein both contained within the mold cavity 42. Thus, as foamable composition 14 continues to expand in bag 16, the composition forms a foam cushion that substantially conforms to the three-dimensional shape of the mold as defined by cavity 42 and closure mechanism 46 while the mold is in the closed position as shown. Various devices may be used to maintain the mold in the closed position, i.e., against the force exerted by the expanding foam in bag 16, including mechanical latches or fasteners; pneumatic or hydraulic mechanisms, such as gas- or liquid-actuated pistons; or electromechanical devices, such as electromagnets or electronically-actuated latches. In a preferred embodiment, closure mechanism 46 and/or mold housing 44 are movable toward and away from one another by operation of a hydraulic piston (not shown) to which the closure mechanism 46 and/or housing 44 is attached. Further, an electromagnet (not shown) is preferably used to maintain the mold 40 in the closed position, with the attracting portion of the electromagnet positioned on either the closure mechanism 46 or housing 44 and the attracted portion located on the other part of the mold and in alignment with the attracting portion such that, when the two portions of the electromagnet are in contact, mold 40 is fully closed as shown.

An important and advantageous feature of the invention is that mold 40 comprises a material capable of transferring sufficient heat to or from cavity 42 to maintain the cavity at a desired temperature. Thus, mold housing 44, and optionally closure mechanism 46, are preferably formed from highly conductive materials, such as metal (e.g., aluminum, copper, steel, etc.). A preferred material is aluminum, having a thermal conductivity of approximately 120 Btu/hr ft ° F.

It has been found that an optimal mold temperature for producing polyurethane foam from the reaction of an isocyanate and a polyol is greater than about 140° F., preferably ranging from about 140 to about 170° F., and more preferably from about 145 to about 165° F. When the mold temperature is less than about 140° F., more foamable composition is needed to make a fully formed cushion and cure times (i.e., the time necessary for the foam to fully expand and form) are considerably longer than when the mold is above 140° F. Both of these events results in increased manufacturing time and cost. At mold temperatures in excess of about 170° F., the foam-forming reaction occurs very rapidly, often resulting in more open cells, and therefore less cushion performance, and also inconsistency in the density of the foam, which can vary from cushion to cushion and also within a given cushion.

Accordingly, it is preferred that a suitable device be included for controlling the temperature of the mold cavity, i.e., to maintain it at the optimum temperature for the foam being produced. In the case of polyurethane foam, aluminum or a similar metal is sufficiently conductive that internal cooling is generally not necessary to maintain the mold at temperatures less than 170° F. That is, although the isocyanate/polyol reaction is exothermic, aluminum or similar metal has been found to be sufficiently conductive that excess heat is transferred to the air surrounding the mold. However, the rate of cooling is such that heat generally needs to be supplied to the mold in order to maintain its temperature above 140° F. Thus, a suitable temperature control loop is preferably included as a part of the mold 40.

As illustrated in FIG. 4, such a control loop may include a temperature controller 64, a temperature sensor 66, and heating elements 68. Any suitable pneumatic or electronic temperature controller may be used, such controllers being commercially available from a number of different sources. The temperature sensor is positioned on the mold 40 in such a manner that it is able to detect the temperature of the cavity 42, e.g., by being mounted on the outside of the housing 44 with a probe extending into the cavity via a small opening in the housing. The sensor may be any conventional type, such as a thermocouple, which electronically transmits temperature data to the controller 64. Thermocouples are well known in the art, and are widely available from a number of different commercial sources. Heating elements 68 are preferably positioned in or on the mold 40 in such a way that they are able to transfer heat energy to the cavity 42. An example of such an arrangement is illustrated in FIG. 4. The heating elements may be any type of element that is capable of transferring heat energy, such as a steam actuated heat exchanger or an electrical resistor that converts electrical energy to heat energy. The type illustrated are known as cartridge-type electrical resistance heaters and are placed in appropriately sized holes in cavity housing 44. In operation, when the temperature sensor 66 indicates to the controller 64 that the temperature within the cavity 42 is lower than a given set point (intended) temperature, e.g., 140° F. for polyurethane foams, the temperature controller 64 generates a signal to permit an electrical current to flow to the heating elements 68. The current continues to flow until the temperature sensed within the cavity rises above the set point.

In this manner, the temperature within the cavity 42 is maintained at an optimum foam cushion production temperature such that the cushions produced are of excellent quality and have uniform size, shape, and weight.

Figure 5:
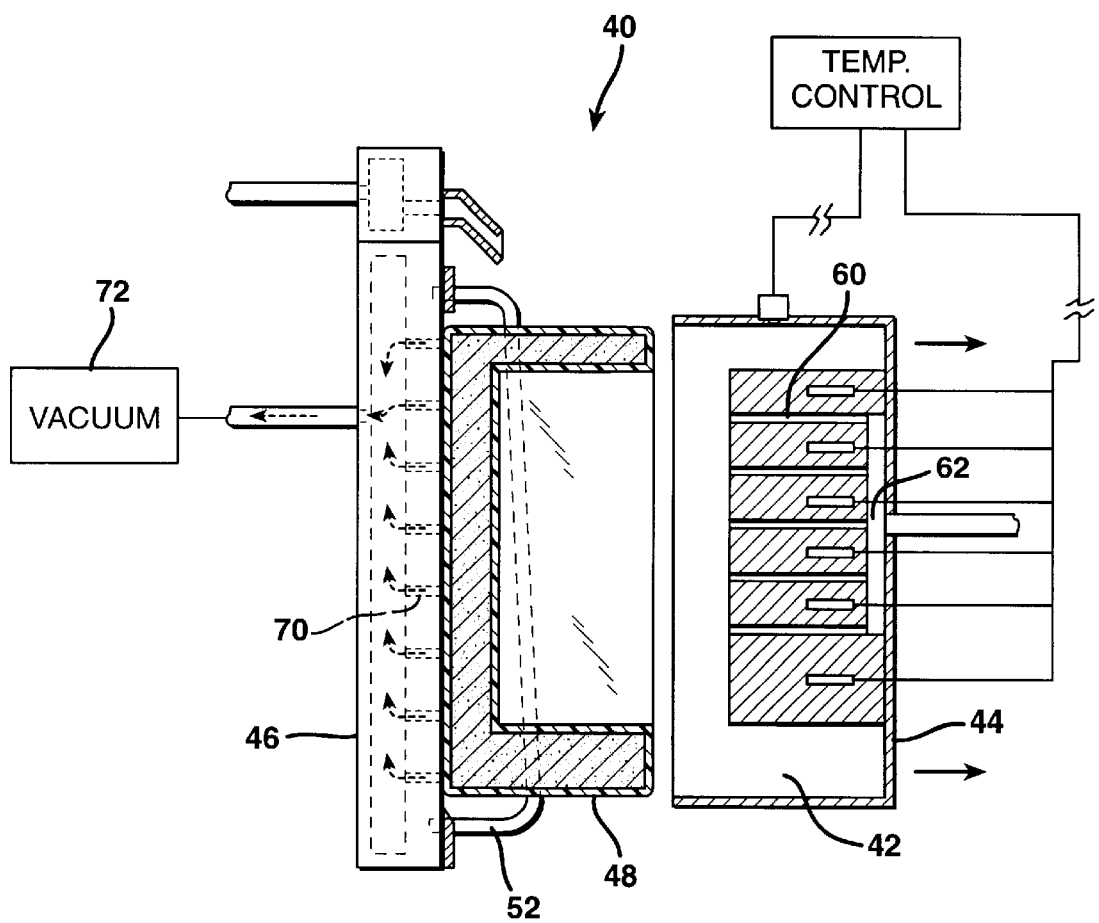
FIG. 5 is similar to FIG. 4, except that the foam has fully formed a molded cushion, and the mold has opened with the closure mechanism pulling the cushion from the mold cavity.

Referring now to FIG. 5, another important feature of the invention is illustrated, namely, means for pulling the completed foam cushion 48 from the mold cavity 42. Such cushion removal means preferably includes one or more openings 70 in closure mechanism 46 through which at least a partial vacuum from a suitable source 72 (e.g., a vacuum pump) can be applied. Openings are positioned such that, when a vacuum is applied, foam cushion 48 is pulled towards and held against closure mechanism 46. In this manner, when mold 40 is moved to the open position as shown, closure mechanism 46 pulls the cushion 48 from the mold cavity 42. Accordingly, the steps of opening the mold and pulling the foam cushion from the cavity occur simultaneously, thereby streamlining the cushion production process (relative to conventional processes as discussed above). Further, by including a mechanism to automatically pull the cushion from the mold, the reliability of the cushion-removal step of the production process is also improved.

If desired, additional features may be included to further assist in cushion removal. For example, means may be provided to push the cushion from the mold housing, such as by blowning air through orifices 60 in mold cavity 42 via manifold 62; inserting mechanical push pins (not shown) through appropriately sized openings in the rear wall of the housing 44; and applying a non-stick coating to the inner surfaces of the mold housing (e.g., TEFLON) and closure mechanism 46.

Figure 6:
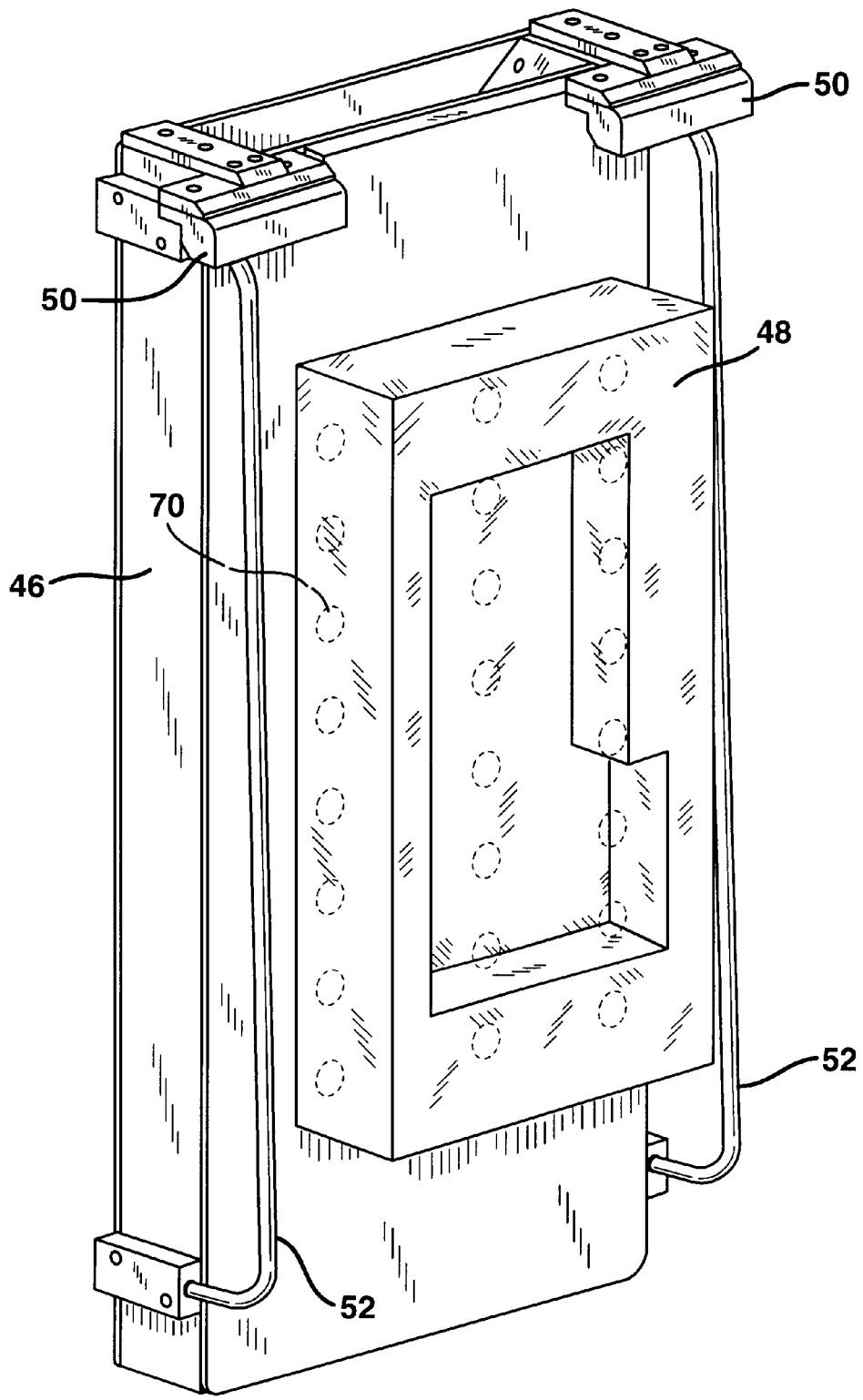
FIG. 6 is a perspective view of the closure mechanism and foam cushion shown in FIG. 5.
Figure 7:
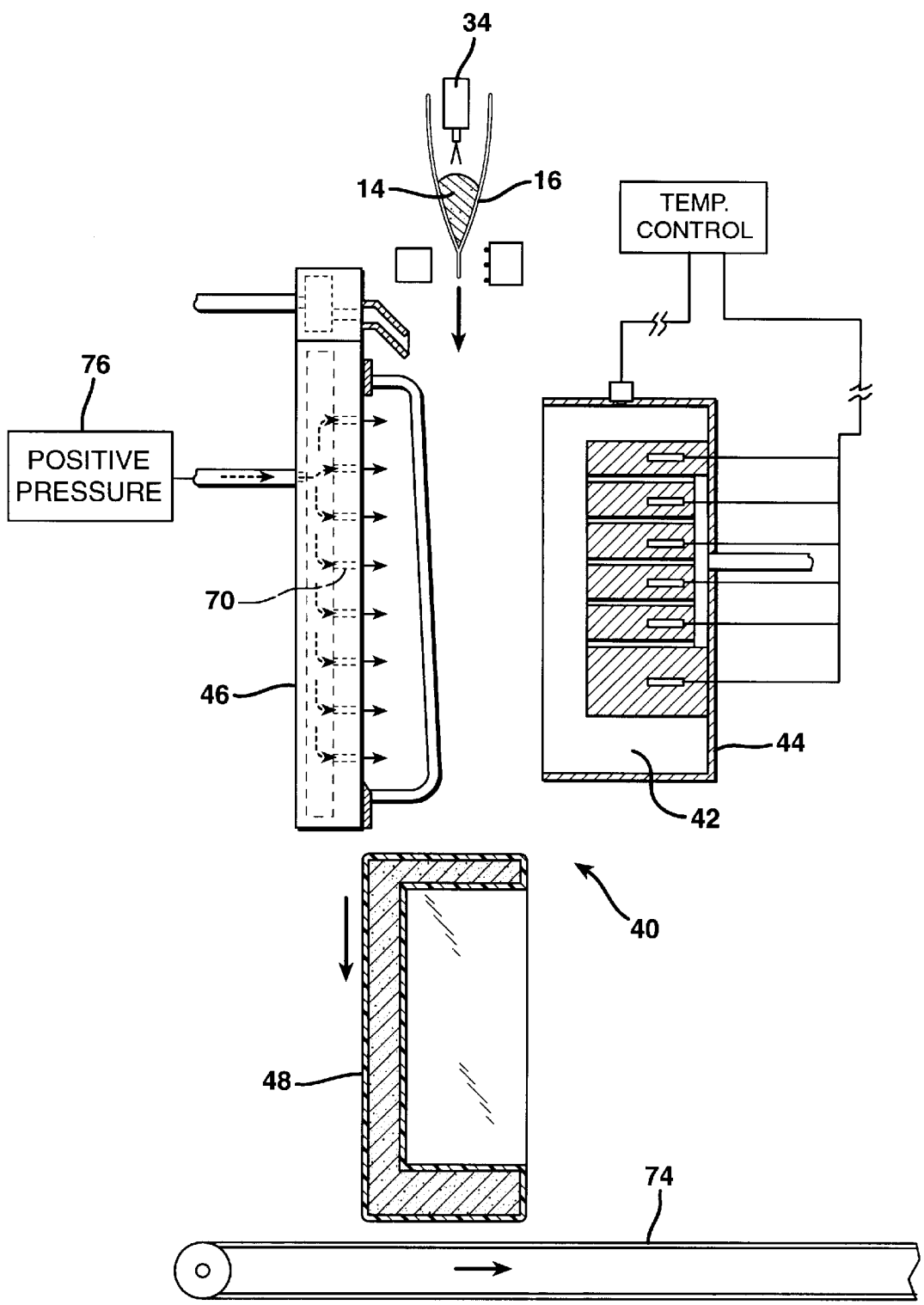
FIG. 7 is similar to FIG. 5, except that the foam cushion is being placed by the closure mechanism onto a conveyor belt.

FIG. 6 provides a perspective view of the finished cushion 48 after it has been removed from mold cavity 42 and is held by closure mechanism 46 by force of vacuum applied through openings 70. Another advantageous feature of the invention is that, not only does closure mechanism 46 automatically pull the cushion from the mold cavity, it retains the cushion on the surface thereof and, by appropriate movement of the housing 44 and/or the closure mechanism 46, is able to precisely place the finished cushion in a desired location. One example of such a feature is illustrated in FIG. 7, in which closure mechanism 46 delivers the finished cushion 48 to a transport mechanism 74. This may be accomplished by positioning the transport mechanism beneath the closure mechanism 46 and then simply shutting off the vacuum to openings 70 or, optionally, switching to a positive pressure source 76 to blow air through the openings 70 as shown. Such action causes the cushion 48 to drop from the closure mechanism and land on the transport mechanism 74 positioned therebeneath. The transport mechanism, in turn, conveys the foam cushion to a desired location, e.g., a packaging station in which the cushions fitted around articles for shipment. The transport mechanism may be a conveyor belt as illustrated, or any suitable means for transporting the finished cushions to an intended destination.

As also illustrated in FIG. 7, with the successful removal of finished cushion 48 from mold 40, a new cushion production cycle begins with dispenser 34 adding foamable composition 14 to a new bag 16 as the bag descends into mold 40.

Figure 8:
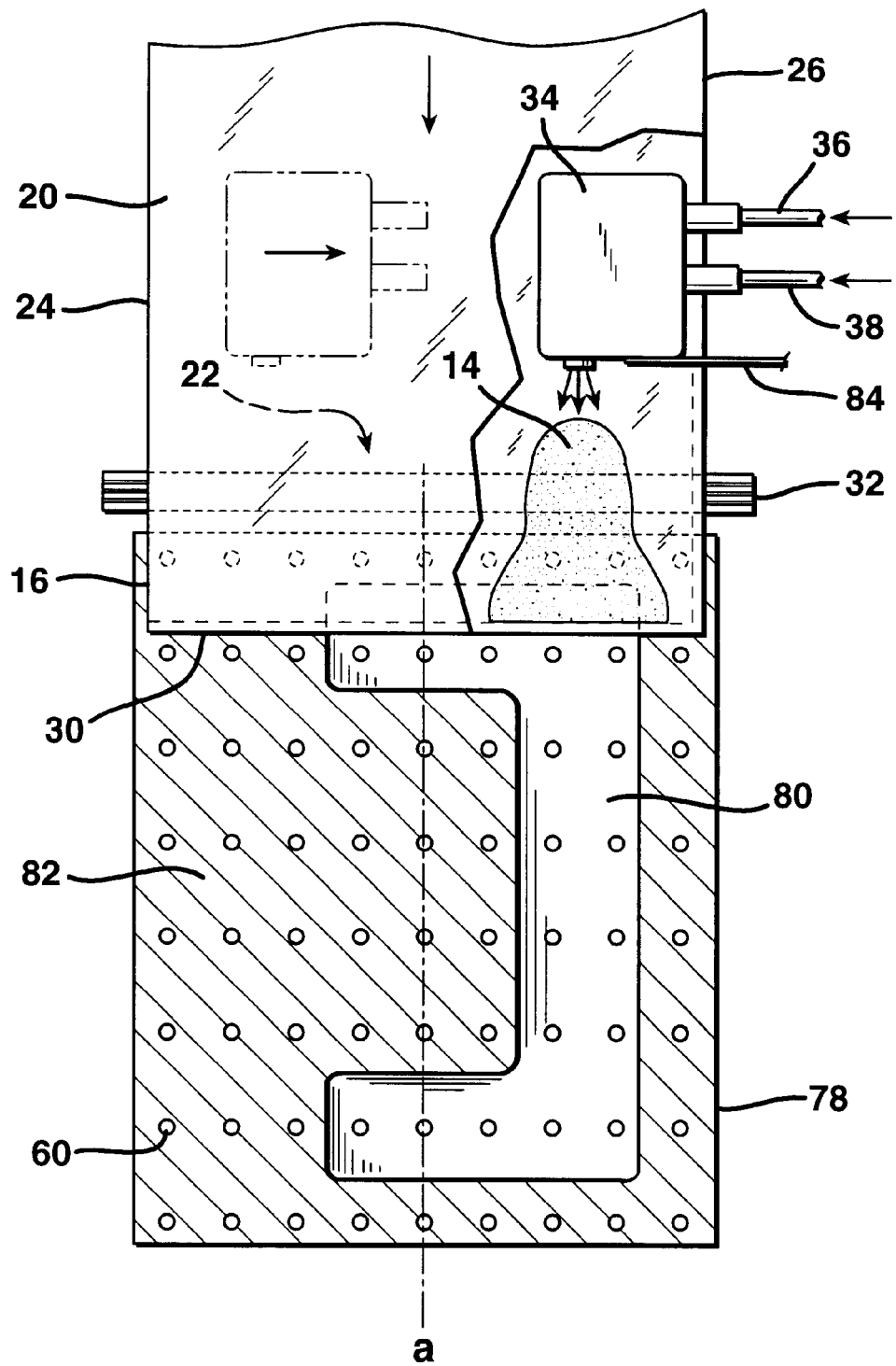
FIG. 8 illustrates a preferred feature of the invention, in which the foam dispensing device is movable in relation to the bag to accommodate off-center mold shapes.

Turning now to FIG. 8, a further feature of the invention will be described, wherein all components are the same as described above, and therefore have the same numbers, except for the shape of the mold cavity as will be explained. The mold cavity 42 shown in FIGS. 1–5 has a generally concentric shape about the vertical axis, with the central portion being generally solid and the peripheral portion being generally recessed or hollow such that, by dispensing the foamable composition generally in line with the vertical axis of the mold cavity, the foamable composition is distributed evenly into the peripheral hollow portion of the mold when the mold is closed. That is, when the mold is closed, the force of the closure mechanism against the solid, central portion of the mold cavity forces most of the foamable composition to the outer, peripheral portion of the mold in a generally uniform manner so that most of the foam will form within the space provided in the peripheral portion as intended.

The mold housing 78 shown in FIG. 8, however, has a shape that is generally asymmetric relative to the vertical axis "a". In other words, the majority of the cavity portion 80 is to the right of the vertical axis, while the majority of the housing 78 to the left of the vertical axis is a solid or non-recessed portion 82. The inventors have found that, with such asymmetric mold designs, if the foamable composition were dispensed generally in line with the vertical axis, i.e., down the center of the mold, a substantial portion of the foamable composition would be squeezed to the left of the vertical axis, and would thereby be squeezed outside of the mold when the mold is closed. This is because there is generally insufficient space between the closure mechanism and the mostly solid part of the mold left of the vertical axis to accommodate the volume required by the foamable composition, particularly as it expands into a foam.

To overcome this problem, dispensing device 34 is preferably movable relative to the bag opening 22 such that foamable composition 14 can be dispensed at a plurality of locations within bag 16 to accommodate a variety of different mold shapes, particularly those having asymmetrical geometries wherein the majority of the mold's hollow space is to the left or the right of the vertical centerline. In a preferred embodiment, the dispensing device is translatable, e.g., from a position to the left of the vertical centerline to a position to the right of the vertical centerline as shown (and as also indicated in FIG. 1). This can be accomplished by mounting the dispensing device 34 to a bracket 84. Bracket 84, in turn, may be attached to any suitable mechanical, hydraulic, or electromechanical device, such as an airdriven piston, which is capable of translating the bracket 84 and dispenser 34 to various positions relative to bag opening 22.

Accordingly, since the majority of cavity portion 80 of mold housing 78 is to the right of the vertical centerline "a," dispensing device 34 is moved to the position shown to the right of the centerline wherein the foamable composition 14 is dispensed into bag 16 in alignment with the largest part of the cavity 80. In this manner, when the bag 16 has fully descended to cover the mold housing, most of the foamable composition will be positioned adjacent to the cavity 80. Thus, when the mold is closed, the foamable composition will expand within the cavity as intended and not be squeezed outside of the mold.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A machine for forming molded foam cushions, comprising:
   a. an apparatus for enclosing a foamable composition in a flexible bag, said apparatus comprising
      (1) a mechanism for converting a predetermined amount of flexible film into a bag having an opening therein,
      (2) a device for dispensing a predetermined amount of said foamable composition through said opening and into said bag, said dispensing device being movable relative to said bag opening such that said foamable composition can be dispensed at a plurality of locations within said bag to accommodate different mold shapes, and (3) a device for closing said opening in said bag;

b. a mold having a cavity and a closure mechanism and being movable between an open position and a closed position such that, when in said closed position, said closure mechanism and said cavity define an enclosed three-dimensional shape, said mold comprising a material capable of transferring sufficient heat to or from said cavity to maintain said cavity at a desired temperature;

c. a device for controlling the temperature of said mold cavity;

d. means for placing said bag in said mold cavity while said mold is in said open position, whereby, when the mold assumes said closed position, said foamable composition expands within said cavity to form a foam cushion that substantially conforms to said three-dimensional shape; and e. means for pulling said foam cushion from said mold cavity.

2. The machine of claim 1, wherein said bag placement means comprises a. means located on said closure mechanism for pushing the bag towards said mold cavity; and b. means located in said mold cavity for pulling the bag into said mold cavity.

3. The machine of claim 1, wherein said means for pulling comprises one or more openings in said closure mechanism through which at least a partial vacuum can be applied, said one or more openings being positioned such that, when a vacuum is applied, said foam cushion is pulled towards said closure mechanism, whereby, when said mold is moved to said open position, said closure mechanism pulls said cushion from said mold cavity.

4. The machine of claim 1, further including a transport mechanism for conveying said foam cushion to a desired location, said cushion removal means being capable of delivering said cushion to said transport mechanism.

5. The machine of claim 1, wherein said mold is formed from a metal.

6. The machine of claim 1, wherein said foamable composition comprises at least one polyol and at least one isocyanate.

7. A machine for forming molded foam cushions, comprising:

a. an apparatus for enclosing a foamable composition in a flexible bag;

b. a mold having a cavity and a closure mechanism and being movable between an open position and a closed position such that, when in said closed position, said closure mechanism and said cavity define an enclosed three-dimensional shape, said mold comprising a material capable of transferring sufficient heat to or from said cavity to maintain said cavity at a desired temperature;

c. a device for controlling the temperature of said mold cavity;

d. means for placing said bag in said mold cavity while said mold is in said open position, whereby, when the mold assumes said closed position, said foamable composition expands within said cavity to form a foam cushion that substantially conforms to said three-dimensional shape, said bag placement means comprising means located on said closure mechanism for pushing the bag towards said mold cavity; and e. means for pulling said foam cushion from said mold cavity.

8. The machine of claim 7, wherein said apparatus for enclosing a foamable composition in a flexible bag further comprises:

a. a mechanism for converting a predetermined amount of flexible film into a bag having an opening therein;

b. a device for dispensing a predetermined amount of said foamable composition through said opening and into said bag; and c. a device for closing said opening in said bag.

9. The machine of claim 8, wherein said dispensing device is movable relative to said bag opening such that said foamable composition can be dispensed at a plurality of locations within said bag to accommodate different mold shapes.

10. The machine of claim 7, wherein said bag placement means further comprises means located in said mold cavity for pulling the bag into said mold cavity.

11. The machine of claim 7, wherein said means for pulling comprises one or more openings in said closure mechanism through which at least a partial vacuum can be applied, said one or more openings being positioned such that, when a vacuum is applied, said foam cushion is pulled towards said closure mechanism, whereby, when said mold is moved to said open position, said closure mechanism pulls said cushion from said mold cavity.

12. The machine of claim 7, further including a transport mechanism for conveying said foam cushion to a desired location, said cushion removal means being capable of delivering said cushion to said transport mechanism.

13. The machine of claim 7, wherein said mold is formed from a metal.

14. The machine of claim 7, wherein said foamable composition comprises at least one polyol and at least one isocyanate.

* * * * *